United States Patent [19]

Lang

[11] 4,241,018

[45] Dec. 23, 1980

[54] APPARATUS WITH EXCHANGEABLE BURETTES

[75] Inventor: Karl Lang, Uerikon, Switzerland

[73] Assignee: Mettler Instrumente AG, Greifensee, Switzerland

[21] Appl. No.: 37,738

[22] Filed: May 10, 1979

[30] Foreign Application Priority Data

Sep. 15, 1978 [CH] Switzerland ........................ 9663/78

[51] Int. Cl.[3] ......................... G01N 31/16; B01L 3/02

[52] U.S. Cl. ...................................... 422/75; 422/100; 422/103; 422/104

[58] Field of Search ..................... 422/75, 76, 77, 100, 422/102, 103, 104; 204/1 T, 195 T; 222/288

[56] References Cited

U.S. PATENT DOCUMENTS

| | | | |
|---|---|---|---|
| 3,175,734 | 3/1965 | Heiss | 422/75 X |
| 3,547,781 | 12/1970 | Guigan et al. | 422/100 X |
| 3,567,398 | 3/1971 | Farr | 422/100 |
| 3,676,076 | 7/1972 | Grady | 422/102 X |

FOREIGN PATENT DOCUMENTS 590689 8/1977 Switzerland .

*Primary Examiner*—Barry S. Richman
*Attorney, Agent, or Firm*—Kurt Kelman

[57] ABSTRACT

In known apparatus with exchangeable burettes, a supply cylinder and its associated storage container were arranged on a palette. When the titrating medium was to be changed, the palette had to be removed from the operating unit and replaced by another palette carrying the storage container and associated cylinder with the changed medium. Handling is facilitated and changing of the titrating medium is accelerated with the arrangement of the invention wherein each cylinder has its associated storage container and the cylinder can be stored on the container. On use, a selected cylinder is directly mounted on the operating unit.

7 Claims, 4 Drawing Figures

APPARATUS WITH EXCHANGEABLE BURETTES

The present invention relates to an apparatus with exchangeable burettes which comprises an operating unit and a plurality of supply cylinders for the respective burettes mounted on the operating unit and selectively connectable thereto.

In titrations with changing titrants (or in metering different solutions), the requirement for burettes and their associated storage containers grows rapidly if each standard solution has its own titrator. To reduce these requirements, Swiss Pat. No. 590,689 discloses an apparatus with exchangeable burettes of the above-indicated type. This known apparatus comprises a single operating unit with a plurality of palettes each carrying a storage container and an associated burette cylinder for the respective titrants. The palettes are selectively mounted on the operating unit, a suitable detachable coupling being provided for connecting a drive in the operating unit with a titrant delivering piston in the cylinder. For changing a burette, an entire palette with its cylinder and storage container must be replaced on the operating unit by another such palette. The palettes carrying the full storage container are relatively heavy and their handling is cumbersome and sometimes dangerous. In addition, the expense for the palettes is high and the volume of the storage bottles must be held relatively low, due to the structure of the palettes.

It is the primary object of this invention to provide an apparatus with exchangeable burettes which is simpler in structure and easier in handling than the conventional apparatus, and which furthermore makes possible accelerated titrant changes without reducing operating safety and titrant storage independent of the dimensions of the operating unit.

The above and other objects are accomplished according to the invention with a storage container associated with each supply cylinder, each storage container including a mount defining a recess for receiving and holding the associated cylinder. With this arrangement, only the supply cylinder is mounted directly on the operating unit, when needed, no palette being required and the handling being much simplified while each cylinder remains clearly associated with the respective solution stored in the storage container. The volume of the storage container may have any desired size since the container is no longer moved at each change of titrant.

The above and other objects, advantages and features of the present invention will become more apparent from the following detailed description of a now preferred embodiment thereof, taken in conjunction with the accompanying drawing wherein FIG. 1 is a perspective view of the entire apparatus with exchangeable automatic burettes;

Figure 1:
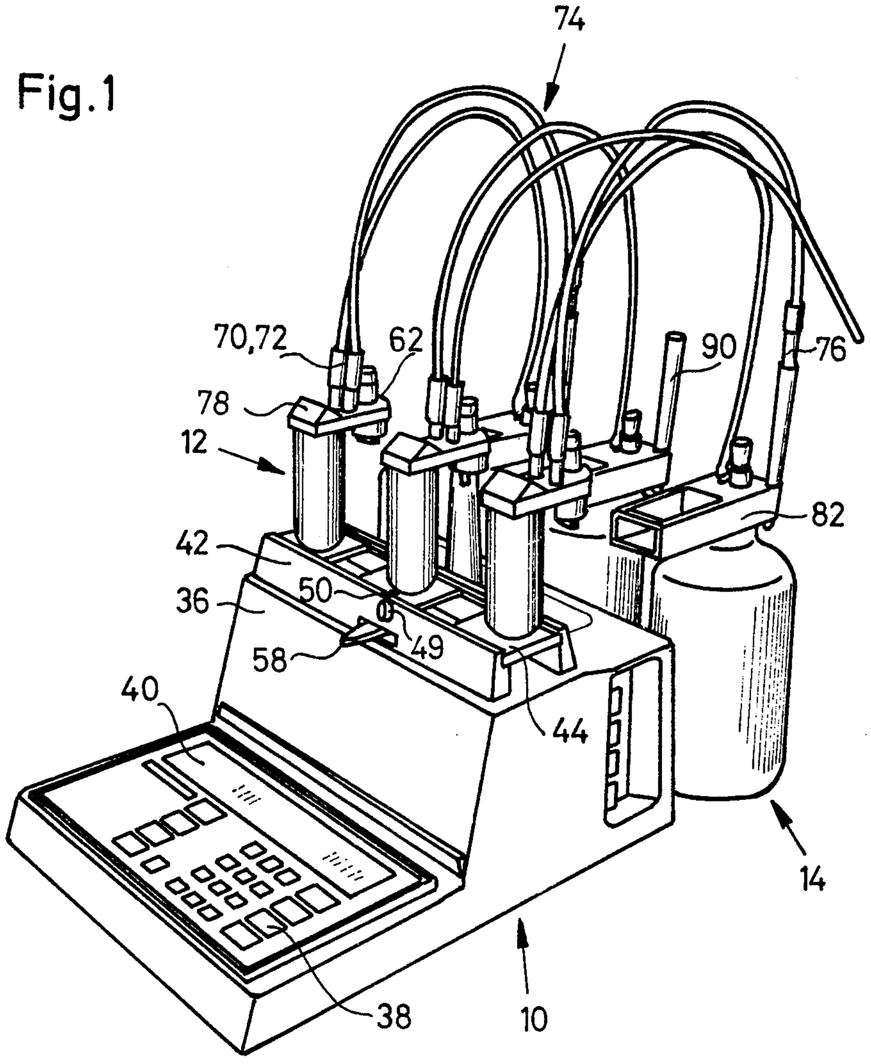

Referring now to the drawing, the apparatus with exchangeable automatic burettes is shown to comprise operating unit 10, supply cylinders 12 and associated storage containers 14. The illustrated operating unit comprises sheet metal frame 16 including mounting plate 15 which carries the operating elements of operating unit 10 and sheet metal housing 36 positioned over the frame and encasing the operating elements. First motor 18 is mounted in the operating unit and has its output shaft connected to transmission 20 which couples spindle 22 to the output shaft of the motor and enables the motor to rotate the spindle. Internally threaded sleeve 21 is threaded mounted on spindle 22, this sleeve being slidably journaled in bearing 17 in mounting plate 15, rotation of spindle 22 by motor 18 causing sleeve 21 to move rectilinearly in a vertical direction. The threaded axial bore of sleeve 21 terminates short of solid upper end 23 which has means for detachably connecting selected supply cylinders 12 to operating unit 10. The illustrated connecting means is a recess 25 in upper end 23 accessible through slot 27. Titrant delivery piston 24 is slidably arranged in supply clinder 12 for vertical movement by sleeve 22 when coupled to its upper end 23, for which purpose piston rod 19 has coupling element 98 which may be detachably held in recess 25 to couple the piston to the sleeve for reciprocation of the piston in the cylinder.

Second motor 26 is also mounted in operating unit 10 and has its output shaft connected to transmission 28 which couples shaft 30 to the output shaft of the motor and enables the motor to rotate the shaft. Shaft 30 drive stopcock 62 in the manner to be described more fully hereinafter, together with the description of the operation of piston 24.

Figure 2:
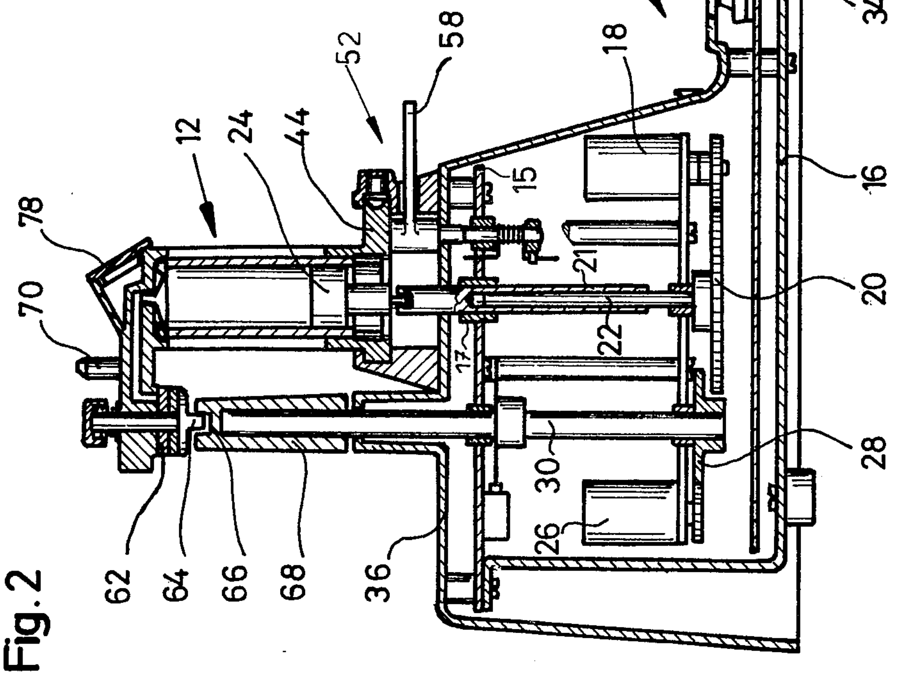
FIG. 2 shows the apparatus in transverse center section.

FIG. 2 further shows printed circuits 32 and digital indicator 34 arranged in housing 36, together with other operating elements none of which have any bearing on the invention and which are, therefore, not shown. As shown in FIG. 1 and also forming no part of this invention, the operating unit housing comprises a control panel 38 with various control buttons required for the operation of the apparatus in a generally known manner, glass window 40 on the control panel covering digital indicator 34.

Housing 36 has a top and guide track 42 comprised of a pair of parallel rails is mounted on the housing top and extends transversely across the entire width of operating unit 10, as shown in FIG. 1. Upper end 23 of piston drive sleeve 21 projects beyond the housing top between the guide rails and supply cylinders 12 are mounted on track 42 for sliding movement therealong. For this purpose, the illustrated embodiment provides guide grooves 41 in guide rails 42, guide grooves receiving base 44 of cylinder 12 and permitting the bases of the supply cylinders to slide in the grooves for movement of the cylinders along track 42. In the operating position, i.e. when a respective cylinder 12 is in registry with spindle 22 and sleeve 21, a spring-biased detent means is arranged on the guide track in one of the rails for engaging a selected cylinder in this position along the track. The illustrated detent means comprises hemispherical detent 46 inwardly biased by spring 45 for snap engagement with a corresponding recess 48 in cylinder base 44, thus correctly positioning the cylinder. In addition, as shown in FIG. 1, the front guide rail which has the detent means also carries optical marker 49 for registry with optical marker 50 on cylinder base 44.

The guide track for the supply cylinders very much simplifies and thus accelerates the handling of the cylinders for an exchange of the associated burettes, particularly in those cases where normally only a few standard solutions are used alternatively. With the snap detent and the auxiliary optical markers, an exact positioning of each cylinder in the operating position is assured.

Figure 3:
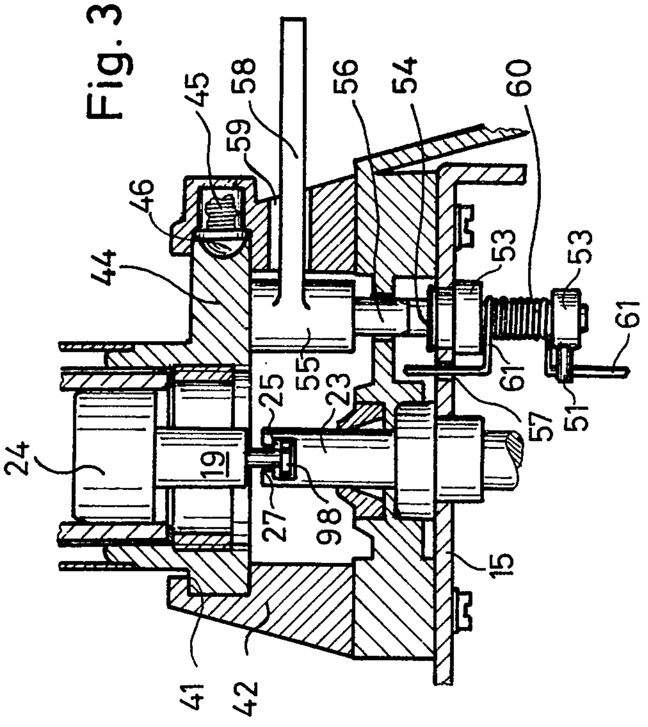
FIG. 3 is an enlarged sectional view of a detail of the apparatus.

During delivery of titrant, each supply cylinder must be held at the operating position against vertical movement. In the known apparatus described hereinabove, the palette is stopped against vertical movement by operation of a lever which tensions a spring in one end position and releases the spring tension in the other end position. Thus, stopping as well as release requires operation of the lever. If the operator forgets to throw the lever, titration is started without the palette being held against vertical movement. In accordance with the illustrated preferred embodiment of the invention, this source of error is prevented and operation of the apparatus is further simplified by a stop means for holding a selected cylinder in a vertically fixed operating position on the housing top. This stop means is best shown in FIG. 3 and includes spindle 56 threadedly mounted in tapped hole 54 of large pitch in the housing top. The spindle has end 55 normally bearing against the selected cylinder in the operating position, the spindle end engaging the underside of cylinder base 44 and pressing thereagainst under the upward bias of torsion spring 60. The torsion spring is held between a pair of shoulders 53 and its respective ends 61 are engaged by abutment 51 on one of the shoulders, on the one hand, and bore 57 in mounting plate 15, on the other hand, to impart an upward bias to spindle 56 whereby spindle end 55 bears against the selected cylinder. Lever 58 is affixed to spindle end 55 and projects through slot 59 in the front rail of track 42 for turning the spindle against the spring bias whereby the spindle end is released from bearing against the selected cylinder. This stop means is so dimensioned that spindle end 55 presses cylinder 12 upwardly before lever 58 is at an end position. In this manner, the vertical play of cylinder base 44 in track guide grooves 41 is eliminated and the cylinder is automatically stopped in a vertically fixed position. Operation of the lever is required only for release of the cylinder.

Figure 4:
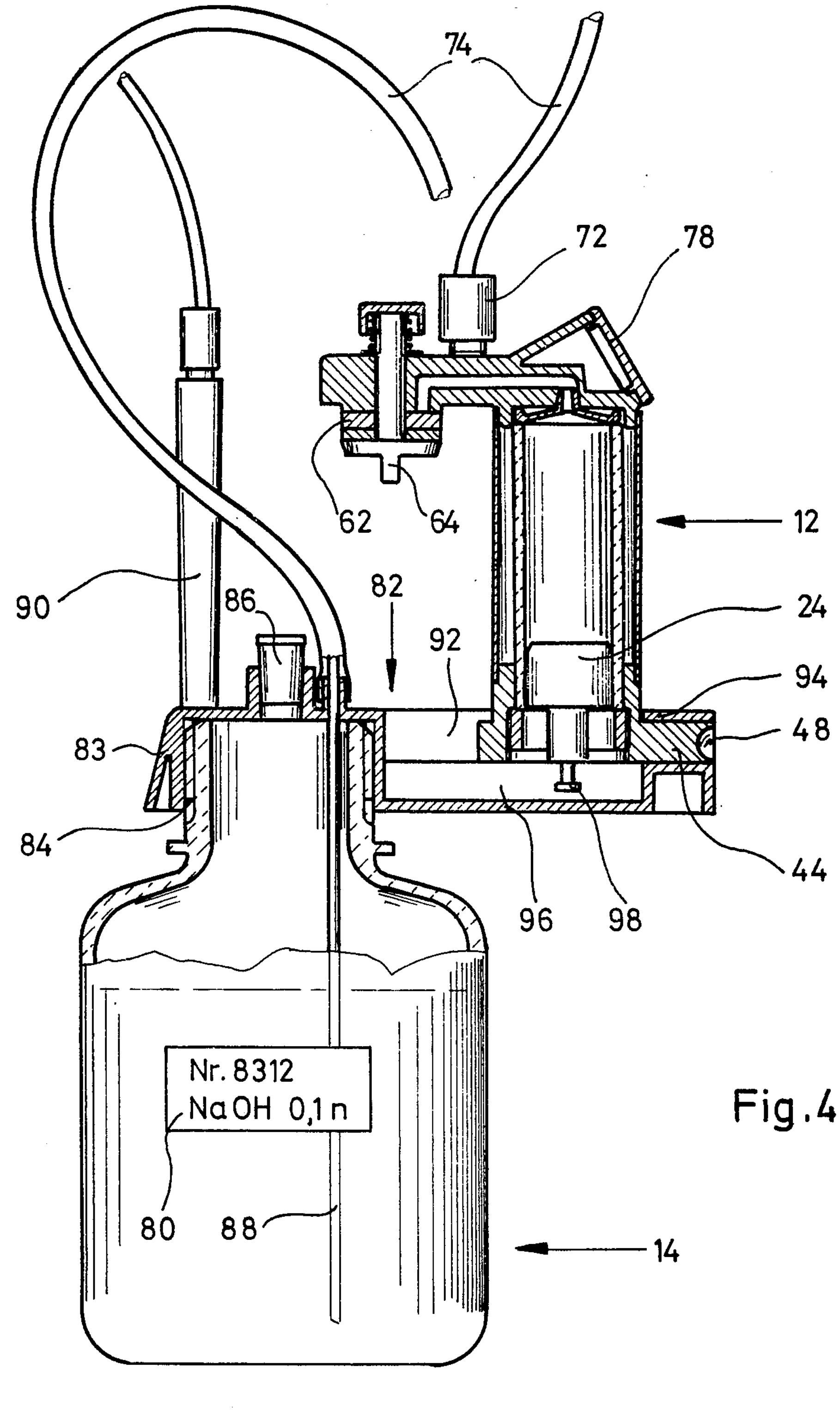
FIG. 4 is an enlarged side elevational view of a storage container with associated cylinder, partly in section.

As best shown in FIG. 4, each supply cylinder has a stopcock illustrated as flat cock 62 including operating lug 64 projecting downwardly from the cock. As illustrated in FIG. 2, when a selected cylinder is connected to spindle drive 21, 22 in the operating position, lug 64 is received with some tolerance in groove 66 in the upper end of sleeve 68 keyed to shaft 30. Thus, rotation of shaft 30 by motor 26 provides a drive for controlling the stopcock, lug 64 and recess 66 constituting a detachable coupling between operating unit 10 and the stopcock of each supply cylinder 12. The fixed portion of stopcock 62 carries two threaded nipples 70 for attachment of titrant conduit hoses 74 by means of screw caps 72, the other ends of the conduit hoses being attached, respectively, to storage bottles 14 and burettes 76.

Identification marker 78 is placed on an oblique face mounted on top of each supply clinder to identify the solution delivered from the cylinder and any other pertinent information, and a corresponding identification marker 80 on the storage container carries the same information. In this manner, the supply of the desired solution may be readily controlled and the proper association of supply cylinders and their storage containers is assured after the cylinder and storage container are temporarily disconnected, for example, during filling of the storage container.

Providing each supply cylinder 12 with its two stopcock 62 which is controlled by drive 26, 28, 30 mounted in operating unit 10 has the advantage that only a single drive is required and the automatic operation of the stopcock elminates manual operations required in prior apparatus of this type.

Storage containers 14 holding the various solutions for the burettes are glass flakes with standard threaded necks which carry special closure 82 of the present invention. Closure 82 may be made of any suitable material, such as light metal or synthetic resin, and includes cap portion 83 and mount 92 extending laterally from the cap portion and defining a recess for receiving and holding associated supply cylinder 12. The cap portion has internal thread 84 for screwing closure 82 on the threaded neck of the storage container. A central vent in cap portion 83 is closed by removable stopper 86. The cap portion defines a bore adjacent the vent for receiving siphoning tube 88 whose lower end extends close to the bottom of the storage container and whose upper end is connected by hose 74 to associated supply cylinder 12 whereby the solution stored in the container may flow between the container and the associated cylinder on movement of piston 24. Cap portion 83 also carries sleeve 90 which serves to receive the associated burette 76 when it is not in use.

In the illustrated embodiment, the recess in mount 92 is rectangular and shaped to accommodate base 44 of supply cylinder 12. A central groove 96 extends downwardly from the recess in the mount to receive coupling element 98 of piston 24. The mount includes yoke 94 receiving a laterally extending portion of base 44 so as to secure the base with the cylinder in position (see FIG. 4).

The recessed mount for receiving and holding the supply cylinder on its associated storage container may take various forms. For instance, the container itself may be shaped to include such a recessed mount rather than the mount forming part of the closure. The latter is preferred, however, because special closures are cheaper to manufacture than specially shaped storage bottles. The closures may be adapted readily to various bottle necks and bottle neck sizes for mounting thereon.

The operation of the apparatus will be partly obvious from the above description of its structure and will be described hereinbelow in further detail:

Beginning from a rest position of the apparatus, titration proceeds in the following manner. The supply cylinder 12 whose associated storage container 14 contains the desired titrant is selected and lever 58 is pivoted to release the cylinder which happens to be in the operating position (center position in FIG. 1.) This cylinder is now moved out of the operating position along track 42 and the selected supply cylinder is slid into this position until spring-biased detent 46 snaps into 48 to indicate that the cylinder has reached the operating position. Lever 58 is now released to permit torsion spring 60 to press spindle end 55 against the underside of base 44 of the selected supply cylinder, thus holding it securely against vertical movement in the operating position. Since lug 64 of stopcock 62 extends parallel to guide track 42, it slides into engagement with groove 66 as the selected supply cylinder is moved into the operating position (see FIG. 2). The apparatus is now ready for titration.

Burette 76 is lifted out of holding sleeve 90 and is introduced into a titration flask (not shown). A desired titration parameter is selected on control panel 38 which is programmed to start the operation in response to the selected parameter. This operation includes actuation of motor 18 to drive sprindle 22 until piston 24 is reciprocated into the zero position. During this initial position movement, some solution is returned from the full supply cylinder to storage container 14. Subsequently, motor 26 is actuated to drive shaft 30 to adjust stopcock 62 into its "delivery" position wherein lug 64 has been turned 90° into a position perpendicular to guide track 64. In this position, solution from supply cylinder 12 is delivered into burette 76 for titration.

Upon termination of the titration, lug 64 is turned back automatically to connect the supply cylinder again to its associated storage container, the rotation of shaft 30 and spindle 22 being so programmed that the turning of lug 64 coincides with a reciprocation of piston 24 to move the piston down a little below the zero position, thus filling the cylinder with solution from the storage cylinder. The operation is substantially repeated if the titration involves more solution than is contained in supply cylinder 12, in which case the stopcock is turned immediately after the entire volume of solution in the supply cylinder had been used up. The cylinder is then filled but, in contrast to the situation wherein the titration is terminated before all the solution has been used up, piston 24 is reciprocated into the zero position before the stopcock is turned back into the "delivery" position to continue the interrupted titration. In this manner, standard size supply cylinders may be provided for most titrations where several sizes were required in prior apparatus.

When the titrant is to be changed, supply cylinder 12 in the operating position is released by pivoting lever 58 and is slid out of the operating position along guide track 42 and the supply cylinder containing the desired titrant is moved and locked into its place, whereupon the above-described operation is repeated.

In the illustrated embodiment, guide track 42 offers five cylinder positions, i.e. it permits a movement of three supply cylinders into and out of the operating position without removing any of the supply cylinders from operating unit 10. Obviously, the guide track could be longer to accommodate more supply cylinders and offer more cylinder positions.

While the invention has been described in connection with a preferred embodiment, many modifications and variations may occur to those skilled in the art without departing from the spirit and scope of this invention as defined in the appended claims. For example, it would be possible to dispense with release lever 58 entirely and to combine the latch and stop mechanisms simply by providing spindle end 55 with a hemispherical detent engaging a corresponding recess in the underside of cylinder base 44. This will make the sliding movement of the cylinder along the guide track more difficult, however, since it will be braked by the spring-biased stop mechanism.

If there are only rare changes of titrant, the width of track 42 could be reduced so as to accommodate only a single supply cylinder on operating unit 10.

What is claimed is:

1. An apparatus with exchangeable burettes, which comprises (a) an operating unit having an operating position, (b) a plurality of exchangeable burettes each being selectively mountable in association with said operating unit, (c) a plurality of supply cylinders selectively mountable on the operating unit and selectively connectable thereto in the operating position, each cylinder being associated with a respective one of the burettes, and (d) a plurality of storage containers with a respective storage container associated with each cylinder and mounted separately from the operating unit, each storage container including a mount defining a recess for removably receiving and temporarily holding the associated supply cylinder.

2. The apparatus of claim 1, further comprising a closure for each storage container, the mount defining the recess forming part of the closure.

3. The apparatus of claim 1 or 2, further comprising an identification marker for each cylinder and a corresponding marker for the storage container associated with each supply cylinder.

4. The apparatus of claim 1 or 2, wherein the operating unit comprises a housing having a top, the supply cylinders being mounted on the housing top in the operating position, and further comprising a stop means for holding a selected one of the cylinders in a vertically fixed operating position on the housing top, the stop means including a spindle threadedly mounted in the housing top and having an end normally bearing against the selected cylinder for holding the selected cylinder in the operating position, a torsion spring biasing the spindle vertically upwardly whereby the spindle end bears against the selected cylinder, and a lever affixed to the spindle end for turning the spindle against the spring bias whereby the spindle end is released from bearing against the selected cylinder.

5. The apparatus of claim 1 or 2, further comprising a stopcock for each supply cylinder and a drive means mounted in the operating unit for controlling the stopcock.

6. The apparatus of claim 1 or 2, further comprising a guide track on the operating unit, the guide track accommodating a plurality of the supply cylinders in a side-by-side configuration.

7. The apparatus of claim 6, further comprising spring-biased detent means arranged on the guide track for engaging a selected one of the supply cylinders in an operating position along the track.

* * * * *